United States Patent Office 3,575,719
Patented Apr. 20, 1971

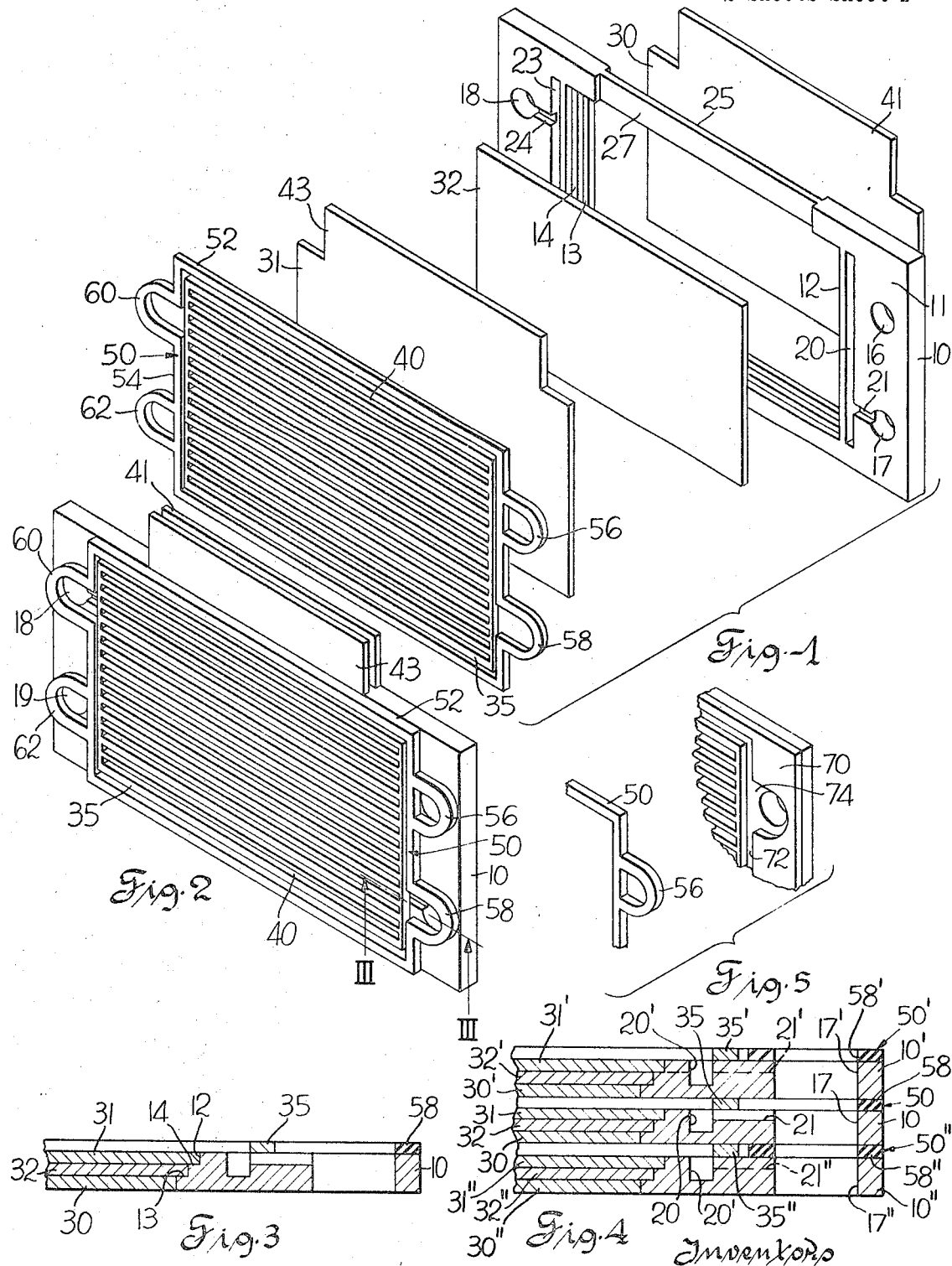

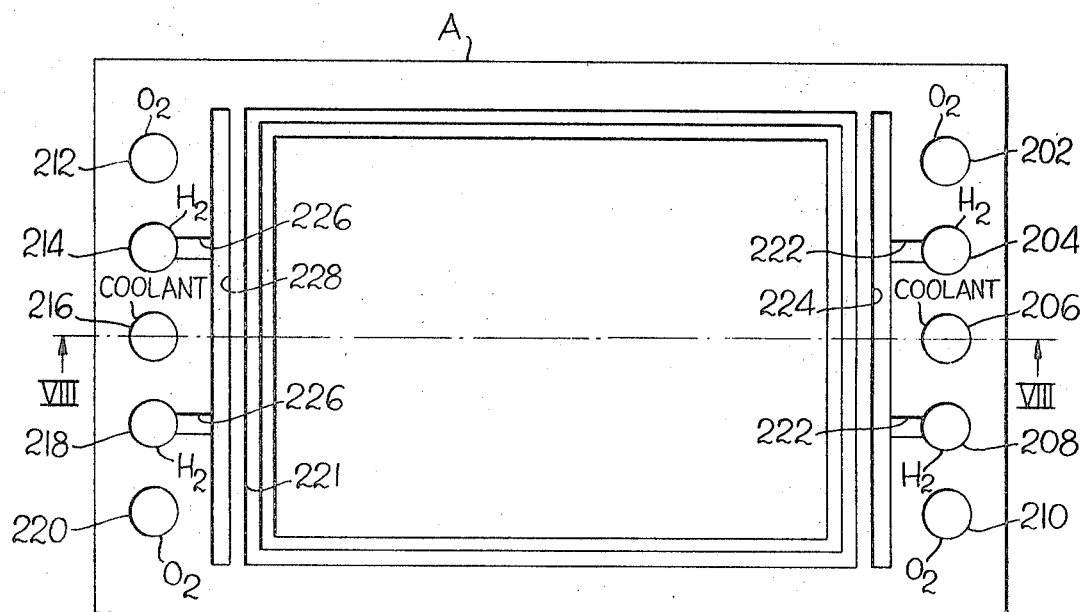
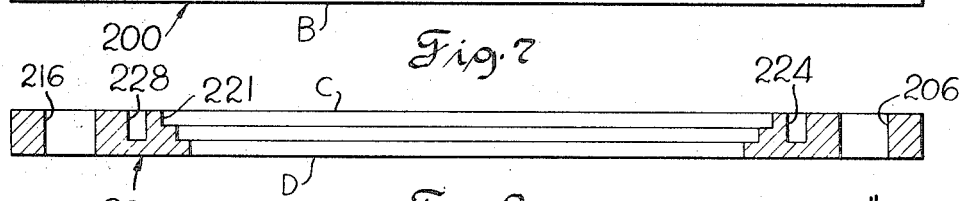
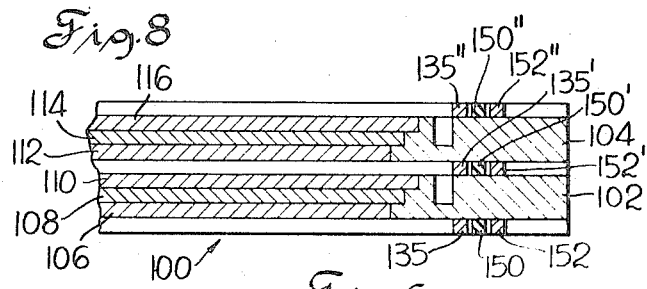

3,575,719
COMPACT CELL CONSTRUCTION
Canden R. Nelson, West Allis, and Hilbert P. Bruss, New Berlin, Wis., assignors to Allis-Chalmers Manufacturing Company, Milwaukee, Wis.
Filed Oct. 9, 1968, Ser. No. 766,129
Int. Cl. B01k 3/00; H01m 27/02
U.S. Cl. 136—86                                                     6 Claims

ABSTRACT OF THE DISCLOSURE

A separable sealing construction for fuel cells and other electrochemical and membrane process cells which permits the nondestructive separation and restacking of the several unitary cells in a plurality of cells, or the disassembly and reassembly of elemental members comprising a single cell. The sealing construction comprises gasket means lying in the same geometric plane or planes as the fluid distribution matrix or matrices of the cell or cell assembly. A further feature is the provision of a symmetrical inlet and an outlet port arrangement in the cell frame which permits reverse edge orientation and reverse surface orientation of the cell frame, while still maintaining a proper fluid flow relation of the inlet and outlet conduits to the inlet and outlet ports.

BACKGROUND OF THE INVENTION

Field of the invention

This invention relates to cells, such as fuel cells and other electrochemical and membrane process cells, and more particularly to a compact cell arrangement including fluid distribution means therefor and further including an improved sealing construction for the cell or cells which prevents intracell, intercell and external leakage of fluid or fluids used in the cells or cell assembly.

Description of the prior art

This invention is an improvement in cells and cell assemblies of the type shown in the United States Patent Application Ser. No. 738,983 of Ronald J. Leonard, filed June 21, 1968, entitled "Compact Electrochemical Cell."

Devices for the direct production of electrical energy from chemical energy by electrochemical means are commonly known as fuel cells.

An individual fuel cell is ordinarily made up of a cell container or frame, two conducting porous electrodes consisting of or impregnated with a material having a catalytic effect upon the desired electrochemical reactions, an electrolyte situated between and in contact with the electrodes, electrical connecting means associated with an external circuit, means for introducing an oxidizing reactant to the cathode, means for introducing a fuel to the anode, and means for removal of by-product water and heat from the fuel cell.

Design considerations dictate that the electrode configuration employed be that which permits the most effective utilization of the available cell space. For most applications, relatively thin, flat, plate type electrodes are employed which permit stacking of the fuel cell elements. This arrangement provides the most advantageous use of space in relation to the output of the fuel cell element.

The aforementioned United States patent application Ser. No. 738,983 of Ronald J. Leonard, provides a compact electrochemical cell construction and assembly comprising a thin, single sheet fluid distribution grid and an abutting frame member containing the electrodes and electrolyte. The fluid predistribution means is provided in the frame which contains the electrodes, thus permitting a thinner fluid distribution grid and accordingly a more compact fuel cell stack or stack of other electrochemical and/or membrane process cells.

In order to generate sufficient power for most practical applications, a plurality, or battery, of individual fuel cells connected electrically in series, in parallel, or in a combination thereof is usually required. Such a structure, commonly referred to as a "fuel cell stack," usually comprises a plurality of alternating cells and backing or fluid distribution plates.

Other electrochemical cells, such as gas electro-winning cells and electrolysis cells, are frequently very similar physically to fuel cells as described above. Their operation, however, is the reverse process to the fuel cell operation. That is, instead of supplying fluid or gases to the electrodes to generate an electrical potential thereacross, an electrical potential is applied to generate a gas or gases at the electrodes. The gases ar taken out of the system through the same types of distribution grids as are used to feed reactants to fuel cells.

SUMMARY OF THE INVENTION

Accordingly, it is an object of the present invention to provide a sealing arrangement which can be used in a compact electrochemical or the like cell or cell assembly to prevent internal or external leakage of fluid passing through the cell or cell assembly, thereby including prevention of both intracell and intercell leakage.

It is another object of the invention to provide an improved electrochemical or the like cell or cell assembly including leakage-sealing components or gaskets in the same plane as that used for distribution of fluid, whereby to permit the superposition of more than one function in the same geometric cell plane.

It is still another object of the invention to provide a sealing arrangement for an individual electrochemical or the like cell or between adjacent cells which provides a more compact construction than is possible with constructions of the prior art.

It is another object of the invention to provide a separable sealing construction for fuel cells and other electrochemical and membrane process cells which permits the non-destructive separation and restacking of the several unitary cells in a plurality of cells, or the disassembly and reassembly of elemental members comprising a single cell.

It is another object of the invention to provide a versatile sealing apparatus and construction for fuel cells and other electrochemical and membrane process cells which may, through repetitious use of similar sealing elements, provide a compact sealing means located in the plane of and surrounding the void or supported void space provided for each of a number of fluid distribution cavities supplying the several functions of a single cell or the repetitious multiplicity of functions for a plurality of cells.

It is still another object of the invention to provide a cell frame for use with cells such as fuel cells and other electrochemical and membrane process cells which permit a given fuel cell frame to be positioned in several orientations in a battery or stack of cells without changing the specific fluid which is manifolded to the cell cavity by the manifolding built into the cell frame.

In achievement of these objectives there is provided in accordance with an embodiment of this invention the combination with a cell such as a fuel cell or other electrochemical or membrane process cell a separable sealing construction which permits the nondestructive separation and restacking of the several unitary cells in a plurality of cells, or the disassembly and reassembly of elemental members comprising a single cell. The sealing construction comprises gasket means lying in the same geometric plane or planes as the fluid distribution matrix or matrices of the cell or cell assembly.

A further feature is the provision of a cell frame having inlet and outlet ports positioned symmetrically about a center line of the frame in such manner as to permit a given cell frame to be positioned in several orientations in a battery or stack of cells without changing the specific fluid which is manifolded to the cell cavity by the manifolding built into the cell frame.

BRIEF DESCRIPTION OF THE DRAWINGS

Further objects and advantages of the invention will become apparent from the following description taken in conjunction with the accompanying drawings, in which:

FIG. 1 is an exploded isometric view of a single cell assembly incorporating a single application of the sealing construction of the invention;

FIG. 2 is a perspective view of the assembled cell of FIG. 1;

FIG. 3 is a partial cross sectional view of the cell assembly taken along line III—III of FIG. 2;

FIG. 4 is a partial cross sectional view of the cell as shown in FIG. 3 except that a plurality of cells are shown in place to illustrate the cooperation between cells in a cell stack;

FIG. 5 is a fragmentary exploded view showing a retaining construction which may be provided to prevent outward movement of the sealing gasket;

FIG. 6 is a view in cross section taken along a section line which does not include the loops on the gasket, of a three-fluid cell utilizing the sealing construction of the invention;

FIG. 7 is a plan view of a modified cell frame in which the fluid ports or holes are located symmetrically about a center line of the cell; and FIG. 8 is a view in section along line VIII—VIII of FIG. 7.

DESCRIPTION OF THE PREFERRED EMBODIMENT

Referring to the drawings, the fuel cell or electrochemical cell assembly of his invention comprises a platelike frame member 10 to which all other components of the cell are secured. Frame member 10 is fabricated of a nonconductive sheet or plate material, and is provided with a large opening 12 in the approximate center of the elongated faces 11 thereof. Although the drawings show frame member 10 and opening 12 to be rectangular, resembling a conventional picture frame, it should be understood that other geometric configurations could be used. A circular configuration particularly may be a desirable shape for some applications.

Frame member 10 is provided with two elongated recesses 25 and 27 on the rearwardly and forwardly facing surfaces of the upper edge of the frame, with respect to the view shown in the drawing, to receive the integral conductive extensions of the electrodes, as will be explained hereinafter.

As shown, the inner surface of frame member 10 forming the periphery of opening 12 is provided, except in the region of recesses 25 and 27, with two steps 13 and 14 which are parallel to the elongated surface 11 of frame member 10, so that opening 12 has larger dimensions on one side of frame member 10 than on the reverse side. The progression of steps to diverge the dimensions of the opening are provided to facilitate assembly of the cell and to provide a positive seal around the border of the electrolyte containing matrix 32 between the electrodes. Hence, the walls forming opening 12 could be smooth if some other means is used to provide a gastight seal between the electrodes.

A pair of reactant inlet ports 16 and 17 are provided through a portion of face 11 on frame member 10 adjacent to opening 12, while a pair of product outlet ports 18, 19 are provided through another portion of face 11 opposed across opening 12 from inlet ports 16 and 17.

An elongated predistribution groove 20 is provided on face 11 between inlet ports 16, 17 and opening 12. Groove 20 does not penetrate all the way through frame member 10, and is parallel to, and substantially of the same length as, the nearest edge of opening 12. Communication between the predistribution groove 20 and one of the inlet ports 16 or 17 is provided by an inlet feeder slot 21. The opposing side, or outlet side, of frame member 10 is substantially identical to the inlet side just described, in that an elongated collecting groove 23 is disposed between the outlet ports 18 and 19 and opening 12, and said collecting groove 23 is parallel to, and substantially of the same length as the nearest side of opening 12, and an outlet feeder slot 24 communicates with the collecting groove 23 and the outlet port 18.

As in more conventional fuel cells, two porous electrodes 30 and 31 are provided and are spaced apart by an electrolyte containing matrix 32. Electrodes 30 and 31 are respectively provided with integral conductive extensions 41 and 43, which serve as electrical terminal connections for the electrodes. The conductive extensions 41 and 43 are respectively received in and extend beyond the recesses 25 and 27 at the upper edge of frame 10. Members 30, 31, 32 are all contained within frame member 10 as follows. Electrode 30, having dimensions which correspond closely with the dimensions on the smaller end of opening 12, is first snugly fitted into said smaller portion of opening 12. The electrolyte containing matrix 32 has dimensions slightly greater than the dimensions of electrode 30 and correspond closely with the next larger portion of opening 12. Thus, matrix 32 is inserted into opening 12 adjacent to electrode 30 and is snugly held in place by the step 13. In the region of recess 25, the corresponding edge portion of matrix 32 seals against the contiguous surface of electrode 30. Electrode 31 has dimensions slightly larger than the dimensions of the electrolyte containing matrix 32, said dimensions corresponding closely with the dimensions of the widest part of opening 12. Electrode 31 is accordingly inserted into opening 12 adjacent to the electrolyte containing matrix 32 and is snugly held in place by step 14. As noted previously, the stepped wall arrangement to diverge the dimensions of opening 12 not only facilitates assembly of the cell, but also provides a positive seal around the border of the electrolyte containing matrix 32 between the electrodes to prevent leakage of the reactants from one electrode to the other at the peripheral edges of the electrodes 30, 31 and matrix 32. Hence, the periphery of the electrolyte matrix 32 pressed and/or bonded against the first step 13 provides one seal, and the periphery of electrode 31 pressed and/or bonded against the second step 14 may provide a second seal.

It is further possible that the walls of opening 12 could be made straight, that is without any steps, to receive electrodes and matrix of equal peripheral dimensions if some other means is used to provide a peripheral seal between the electrodes.

From the drawings and the above description, it is apparent that the frame member 10 should have a thickness no greater than the combined thickness of the two electrodes 30, 31 and the electrolyte containing matrix 32. And accordingly, each step, such as steps 13 and 14 in the periphery of opening 12, should have a height no greater than the thickness of the electrode or matrix that will fit thereinto. In order to effect a suitable seal, it is preferred, however, that the thickness of frame member 10 should be less than the combined thickness of electrodes 30, 31 and matrix 32. That is, a tight peripheral seal can best be effected if the matrix 32 and larger electrode 31 are slightly compressed against steps 13 and 14.

A fluid distribution plate 35, having longitudinal and transverse dimensions less than those of the frame member 10, is positioned over the larger electrode 31. The plate 35 is provided with a plurality of parallel gas distribution through slots 40 which overlie the predistribution groove 20 of frame 10 at one end thereof and the collecting groove 23 at the other end, and are open to the adjacent surface of electrode 31. Accordingly, there is relatively unrestricted passage from one of the inlet ports 16, 17 via the inlet feeder slot 21, predistribution groove 20, fluid distribution slots or grid 40, collecting groove 23, and outlet feeder slot 24 to one of the outlet ports 18, 19. The plate 35 with the spaced lands which provide fluid-passage slots therebetween defines what may be termed a "supported void."

In accordance with the invention, a resilient gasket member formed of a material compatible with the fluids being handled, generally indicated at 50, is positioned in the same plane as the fluid distribution plate 35 and in peripherally surrounding relation thereto. Since the illustrated fluid distribution plate 35 is of rectangular configuration, the gasket 50 includes a generally rectangular peripheral edge 52 which follows the outer periphery of the fluid distribution plate 35 except that at the opposite transverse ends of the gasket 50, the gasket is provided with integral looplike portions, to be described, which are adapted to overlie the inlet ports 16, 17 and the outlet ports 18, 19 of the frame member. Thus, gasket 50 is provided at the right hand edge thereof, with respect to the view shown in the drawings, with a closed loop 56 which closes back upon the straight peripheral end edge 52 of the gasket and is in overlying relation to the inlet port 16. A second loop 58 is positioned in overlying relation to the inlet port 17 of the frame and is in the form of an "open" loop since the loop 58 opens directly toward the inlet feeder slot 21 and the predistribution groove 20, thereby permitting a free flow of fluid from inlet port 17, through inlet feeder slot 21 and predistribution groove 20 to the fluid distribution slots or grid 40. In a similar manner an "open" loop 60 integrally attached to the opposite end wall 54 of the gasket so as to permit free passage of fluid from the fluid distribution slots or grid 40 through the collecting groove 23 to the outlet feeder slot 24 and thence to the outlet port 18.

The gasket also carries an integral "closed" loop 62 on the edge of the gasket in overlying relation to the outlet port 19, loop 62 preventing any fluid leakage around port 19.

Although the assembly as described hereinbefore is representative of one complete elementary individual cell, its proper functioning requires the cooperation of similar cells in immediate face-to-face contact therewith. Specifically, the fluid distribution grid 40 in distribution plate 35 not only supplies reactant to electrode 31, but also to an electrode in the cell immediately adjacent thereto (FIG. 4).

To construct a fuel cell stack, as plurality of individual cells as described hereinbefore must be joined together as shown in FIG. 4. Thus, as indicated in FIG. 4, a cell 10' is positioned above the cell 10 and a cell 10'' is positioned below the cell 10. The electrode 31 of cell 10 and the electrode 30' of cell 10' are both supplied with a reactant through the port 17, the feed slot 21, the predistribution groove 20, and the distribution plate 35. Similarly, the electrode 31'' of cell 10'' and the electrode 30 of cell 10 are both provided with reactant from inlet port 16, inlet slot 21'', predistribution groove 20'' and fluid distribution plate 35''. It can thus be seen that in the embodiment of FIGS. 1–4, the cells cannot be identical in every respect. That is to say, except for the two end cells, there must be two slightly different cell arrangements used and placed in an alternate order within the stack. Thus, half of the individual cells may be substantially as shown in FIGS. 1 and 2. The other half of the cells are substantially the same except that feeder slots 21' and 24' (corresponding to slots 21 and 24) communicate with the other inlet and outlet ports 16 and 19, respectively. In addition, the electrode polarities must also be alternated, so that each distribution plate 35 is disposed between electrodes of like polarity. At one location, the distribution grid, such as 35, will supply fuel to a pair of abutting anodes, and at the next location the grid will supply an oxidant to a pair of abutting cathodes. It is, therefore, apparent that the feeder slots 21, 21', 21'' must alternate between inlet ports 16 and 17 so that in one position fuel is being supplied to the anodes and in the next position oxidant is being supplied to the cathodes.

The two end cells must, of course, be slightly different since they cannot cooperate with adjoining cells. Actually, they can be identical to the cells as shown in FIG. 4 except that means (not shown) must be provided to supply reactant to the lowermost electrode 30'' as seen in FIG. 4, and a sealing means (not shown) must be placed over the distribution grid 35' at the upper end of the assembly of FIG. 4 so that the grid is not open to the atmosphere. In the embodiment shown in FIG. 4, a sealing gasket 50 is interposed between each of the cells 10, 10' and 10'' to insure against peripheral leakage from any of the fluid distribution plates either externally or internally of the cell assembly and also to insure against any cross leakage from one inlet port to another or from one outlet port to another.

It can be seen also that when the plurality of the cells such as 10, 10' and 10'' are stacked in assembled relation to each other that the inlet ports such as 16, 17 and the outlet ports such as 18, 19, together with the ringlike gasket portions such as 56, 58, 60 and 62 interposed between the respective cells, constitute columnar fluid passage manifolds which pass through the assembled stack of cells, the inlet port manifolds 16 and 17, respectively, communicating with alternate fluid distribution plates, and the two outlet manifolds defined by the outlet ports 18, 19 and interposed gaskets, also communicating with alternate fluid distribution grids.

While each cell assembly in the embodiment of FIGS. 1–4 have been illustrated as having two inlet ports and two outlet ports, with the fluid distribution plate of any one cell being connected to only one inlet port and one outlet port, this embodiment is only by way of example, and in practice a given cell such as cell 10 might have three or more such as four inlet ports, for example, and a corresponding number of outlet ports. For example, if a given cell were provided with four inlet ports and four outlet ports to permit initial distribution of, for example, hydrogen, oxygen, a coolant (such as Freon, for example), and vacuum (for water removal) then such a cell would have a corresponding number of fluid distribution grids, namely four fluid distribution grids, each such fluid distribution grid being connected to one of the inlet ports such as 16 or 17 or to one of two other ports, not shown, in the frame by means of a connecting slot such as slot 21 and each such distribution grid being connected to one of the four outlet ports of such frame member. A gasket means 50 would be positioned in the plane of each distribution grid in the same manner as shown in the embodiment of FIGS. 1–4, inclusive.

Referring now to FIG. 5, there is shown a reinforcing arrangement which is preferably used in conjunction with the cell assembly hereinbefore described to prevent "blowout" of the gasket when the internal pressure on the gasket is greater than the external pressure. The reinforcing means for the gasket, as shown in FIG. 5, comprises an overlay plate 70 which is recessed as indicated at 72 and 74 to receive the gasket and surround the entire periphery thereof, thereby providing a reinforcing means peripherally outwardly of the gasket which prevents outward movement of the gasket due to an excess of internal over external pressure on the gasket. To prevent inward movement of the gasket due to excess of external pressure over internal pressure on the gasket, a raised boss (not shown) may be provided around the periphery of the ports such as 16, 17, 18 and 19 of the frame member.

Referring now to FIG. 6, there is shown an assembly of cell elements in which three different fluids are distributed or otherwise handled by the cell assembly. Thus, there is shown in FIG. 6 a cell assembly generally indicated at 100, comprising a cell frame 102 and a cell frame 104. Cell frames 102 and 104 are each respectively similar to the cell frame 10 shown in the embodiment of FIGS. 1–4, inclusive. Cell frame 102 supports a cathode electrode 106, a capillary membrane electrolyte holder 108 which may be similar to the electrolyte matrix 32 of FIG. 1, and an anode electrode 110. Thus, the combination of elements supported by the cell frame 102 are substantially similar to the two electrodes and the electrolyte matrix supported by the cell frame 10 of FIG. 1. Positioned beneath the surface of electrode 106 of cell frame 102 with respect to the view of FIG. 6, is a fluid distribution plate 135 through which oxygen ($O_2$) is distributed to electrode 106. Positioned above the electrode 110 of cell frame 102 is a fluid distribution plate 135′ through which hydrogen ($H_2$) is distributed in contact with the anode 110. The cell frame 104 supports a porous support plaque 112 which lies directly above the surface of the hydrogen distribution plate 135′. A water transport membrane 114 is supported by frame 104 immediately above the porous support plaque 112, and a second porous support plaque 116 is positioned above the surface of the water transport membrane 114. Positioned above the upper surface of the second porous support plaque 116 is a fluid distribution plate 135″ which may be connected to a source of vacuum.

In the operation in the cell assembly of FIG. 6, oxygen is supplied through the fluid distribution plate 135 to the electrode 106, and hydrogen is supplied to the electrode 110 through the fluid distribution plate 135′. The electrodes 106 and 110, constitute the cathode and anode of an electrochemical fuel cell similar to that previously described in connection with the embodiment of FIGS. 1–4, inclusive.

The water transport membrane 114 and the oppositely disposed porous support plaques 112 and 116 define a membrane process cell. In the course of operation of the fuel cell defined by the electrodes 106, 110 and the intervening electrolyte matrix 108, water ($H_2O$) is produced at the anode 110. The vacuum which is applied through fluid distribution plate 135″ is effective to withdraw the water through water transport membrane 114 which is supported on the opposite sides thereof by porous support plaques 112 and 116, respectively, the water passing through water transport membrane 114. The water transport membrane 114 permits the passage of water therethrough to the fluid distribution plate 135″ under the influence of the vacuum, but substantially prevents the passage of any hydrogen ($H_2$) from the region of anode 110 through water transport membrane 114.

The fluid distribution plates 135′, 135′ and 135″ shown in FIG. 6 are respectively similar to the fluid distribution plate 35 shown in FIGS. 1–4 of the drawings. Gaskets 150, 150′ and 150″ which are respectively similar to the gasket 50 shown in the embodiment of FIGS. 1–4, inclusive, are positioned in peripherally surrounding relation to each of the respective fluid distribution plates 135, 135′ and 135″ in the same manner as shown in the embodiments of FIGS. 1–4, inclusive. Gasket retaining members 152, 152′ and 152″ are respectively positioned in peripherally surrounding relation to the respective gasket members to prevent "blowout" of the respective gaskets.

Referring now to FIGS. 7 and 8, there is shown a modified cell frame which provides a symmetrical location of all fluid manifold holes in the cell frame, which permits the frame to be installed indiscriminately in a stack with either of its opposite ends or either of its opposite major surfaces oriented in either of two possible directions.

Thus, there is shown in FIG. 7, a cell frame generally indicated at 200 which is generally similar to the cell frames previously described except that the cell frame of FIG. 7 is provided with a total of five inlet ports and five outlet ports, as distinguished from the two inlet and two outlet ports of the embodiment of FIGS. 1–4, inclusive. The cell frame 200 is provided with inlet ports 202, 204, 206, 208 and 210, respectively, and is provided with outlet ports 212, 214, 216, 218 and 220, respectively. Ports 202 and 210 are assumed by way of example to be oxygen ($O_2$) inlet ports, while the ports 204 and 208 are assumed by way of example to be hydrogen ($H_2$) inlet ports. Port 206, which lies on the center symmetry line of the cell frame, is assumed by way of example to be a coolant inlet port. Similarly, ports 212 and 220 are oxygen outlet ports, ports 214 and 218 are hydrogen outlet ports and the port 216 is a coolant outlet port.

The cell frame 200 is provided with a central recess 221 which is similar to the recess 12 of the embodiment of FIGS. 1 and 2 and is adapted to receive elements such as the electrodes 30, 31, and such as the electrolyte matrix 32 of FIG. 1.

It will be understood, of course, that in the example given, oxygen inlet conduits are positioned so as to register with the two outermost ports (with respect to the line of symmetry) 202 and 210, and that hydrogen inlet conduits are positioned so as to register with the two hydrogen inlet ports 204 and 208 on either side of the line of symmetry and that a coolant inlet conduit is positioned to register with the coolant inlet port 206.

In a similar manner, oxygen outlet conduits are positioned to register with the two outermost ports 212 and 220; hydrogen outlet conduits are positioned to register with the hydrogen outlet ports 214 and 218, and a coolan outlet conduit is positioned to register with the coolant outlet port 216.

The particular cell frame shown in FIGS. 7 and 8 is intended to distribute hydrogen, and accordingly hydrogen inlet ports 204 and 208 are connected by feed slots 222 to predistribution groove 224, and hydrogen outlet ports 214 and 218 are connected by slots 226 to collection groove 228. If the particular cell frame was intended to distribute oxygen rather than hydrogen then the oxygen inlet and outlet port holes would instead be connected through slots to the predistribution and collection grooves. Similarly, if coolant were to be distributed by the particular cell frame, rather than hydrogen or oxygen, then the coolant inlet and outlet ports would be connected by slots to the predistribution and collection grooves, respectively.

Due to symmetrical location of the various inlet and outlet ports just described and shown in FIG. 7, it can be seen that frame 200 can be positioned in any one of several orientations in a battery or stack of cells without changing the specific fluid which is manifolded to the cell cavity by the manifolding built into the particular cell frame. Thus, the cell frame shown in FIGS. 7 and 8 will always manifold hydrogen to the cell cavity, even though the cell frame is turned to reverse the positions of edges A and B, as seen in FIG. 7, or so as to reverse the orientation of surfaces C and D, shown in FIG. 8, without altering the alignment of the several designated fluid manifold holes with all others in the stack intended to carry or transmit the same respective fluids.

From the foregoing detailed description of the present invention, it has been shown how the objects of the invention have been attained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A cell for use as an electrochemical cell or membrane process cell or the like for use in combination with other such cells to construct a battery of cells, comprising a plate-like frame member having a large opening through the face thereof, at least one element supported by said frame member, said one element being adapted to coact with a fluid, said one element being disposed within said large opening and supported at the peripheral edges thereof, and a fluid distribution plate overlaying a face of said frame member and accordingly overlaying the outer surface of said one element whereby said one element is exposed to the fluid distributed by said fluid distribution plate, said frame member having a fluid inlet port and a fluid outlet port extending therethrough, the face of said frame member adjacent said fluid distribution plate being further provided with an elongated predistribution groove between said large opening and said inlet port and an elongated collecting groove between said large opening and said outlet port, a first feeder slot in said frame member communicating between said predistribution groove and said inlet port, a second feeder slot in said frame member communicating between said collecting groove and said outlet port, said fluid distribution plate having oppositely disposed portions thereof respectively overlaying and in fluid communcation with said predistribution groove and said collecting groove, and a sealing gasket member lying in a common plane with said fluid distribution plate and in peripherally surrounding relation to said fluid distribution plate, said gasket member extending in leakage-preventing sealing relation around said inlet port and said first feeder slot and around said outlet port and said second feeder slot but permitting fluid flow from said inlet port through said first feeder slot to said predistribution groove, and permitting fluid flow from said collecting groove through said second feeder slot to said outlet port.

2. A cell as defined in claim 1 in which said one element is a porous electrode.

3. A cell as defined in claim 1 comprising a pair of porous electrodes, said element being one of said pair of electrodes, and an electrolyte containing matrix spacing said electrodes, said electrodes and matrix being disposed within said large opening and supported at the peripheral edges thereof.

4. A cell as defined in claim 1 in which said one element is a water transport membrane.

5. A cell as defined in claim 1 in which said fluid distribution plate is provided with a plurality of fluid distribution slots which overlay said one element, said fluid distribution slots overlaying said predistribution groove at one end of said slots and overlaying said collecting groove at the other end of said slots.

6. A cell as defined in claim 1 in which said cell frame includes a plurality of inlet ports and a plurality of outlet ports, a predetermined first one of said inlet ports being connected by a feeder slot to said predistribution groove, a predetermined second one of said inlet ports not being connected to said predistribution groove, a predetermined first one of said outlet ports being connected by a feeder slot to said collecting groove, a predetermined second one of said outlet ports not being connected to said collecting groove, said gasket member extending in leakage preventing sealing relation around the entire periphery of said predetermined second one of said inlet ports and around the entire periphery of said predetermined second one of said outlet ports.

References Cited
UNITED STATES PATENTS

| | | | |
|---|---|---|---|
| 3,370,984 | 2/1968 | Platner | 136—86 |
| 3,445,294 | 5/1969 | Leonard | 136—86 |
| 3,462,307 | 8/1969 | Voorhies et al. | 136—86 |
| 3,468,712 | 9/1969 | Gillespie | 136—86 |
| 3,489,614 | 1/1970 | Tomter | 136—86 |

OTHER REFERENCES

Netherlands application No. 6802641, August 1968, Gennip et al., 136—86.

ALLEN B. CURTIS, Primary Examiner

U.S. Cl. X.R.

204—277